(12) United States Patent
Sollich

(10) Patent No.: US 7,185,167 B2
(45) Date of Patent: Feb. 27, 2007

(54) HEAP ALLOCATION

(75) Inventor: Peter F. Sollich, Munich (DE)

(73) Assignee: Microsoft Corporation, Redmond, WA (US)

( * ) Notice: Subject to any disclaimer, the term of this patent is extended or adjusted under 35 U.S.C. 154(b) by 591 days.

(21) Appl. No.: 10/456,896

(22) Filed: Jun. 6, 2003

(65) Prior Publication Data

US 2004/0250041 A1 Dec. 9, 2004

(51) Int. Cl.
G06F 12/00 (2006.01)
(52) U.S. Cl. .................................. 711/173; 718/104
(58) Field of Classification Search .................. 711/173
See application file for complete search history.

(56) References Cited

U.S. PATENT DOCUMENTS

| | | | |
|---|---|---|---|
| 5,787,447 A * | 7/1998 | Smithline et al. ............ | 707/206 |
| 5,809,554 A | 9/1998 | Benayon et al. | |
| 6,058,460 A * | 5/2000 | Nakhimovsky ............. | 711/153 |
| 6,336,178 B1 * | 1/2002 | Favor ........................... | 712/23 |
| 6,553,476 B1 * | 4/2003 | Ayaki et al. ................. | 711/204 |
| 6,754,788 B2 * | 6/2004 | Mathews et al. ............ | 711/153 |
| 2002/0194421 A1 * | 12/2002 | Berry et al. ................. | 711/100 |

OTHER PUBLICATIONS

Steensgaard, Microsoft Research, "Thread-Specific Heaps for Multi-Threaded Programs," ACM Sigplan Notices, 2001, V 36, N1 (Jan.), pp. 18-24.
Imai et al., "Evaluation of Parallel Copying Garbage Collection on a Shared-Memory Multiprocessor," IEEE Transactions on Parallel and Distributed Systems, vol. 4, No. 9, Sep. 1993, pp. 1030-1040.
Domani et al., IBM Haifa Research Laboratory, "Thread-Local Heaps for Java," ACM Sigplan Notices, 2003, V 38, N2, S (Feb.), pp. 183-194.
Berger et al., "Hoard: A Scalable Memory Allocator for Multithreaded Applications," ACM Sigplan Notices, 2000, V 35, N11 (Nov.), pp. 117-128.
R. Dimpsey et al., "Java server performance: A case study of building efficient, scalable Jvms," IBM Corp, Network Comp Software Div., IBM Systems Journal, 2000, V 39, N1, pp. 151-174.

* cited by examiner

*Primary Examiner*—Brian R. Peugh
*Assistant Examiner*—Hashem Farrokh
(74) *Attorney, Agent, or Firm*—Lee & Hayes, PLLC

(57) ABSTRACT

One or more electronically-accessible media including exemplary electronically-executable instructions that, when executed, direct an electronic apparatus to perform actions including: ascertaining, from multiple processors, a processor on which a requesting thread is executing; each processor of the multiple processors associated with each respective heap of multiple respective heaps; and selecting, for a memory allocation to the requesting thread, a respective heap that is associated with the processor on which the requesting thread is executing responsive to the action of ascertaining. An exemplary apparatus includes: at least one memory having multiple memory portions; multiple processors coupled to the at least one memory, each respective processor of the multiple processors executing a respective thread of multiple threads; and a memory allocator adapted to allocate memory resources from a memory portion of the multiple memory portions to each respective thread responsive to the respective processor on which each respective thread is executing.

32 Claims, 7 Drawing Sheets

HEAP ALLOCATION

TECHNICAL FIELD

This disclosure relates in general to heap allocation and in particular, by way of example but not limitation, to allocating space on multiple heaps for multiple threads with regard to processor usage.

BACKGROUND

Modern computing and the programming that is a part thereof typically provides multitasking. Multitasking is the ability to perform, or to appear to a human user to perform, multiple tasks simultaneously. For example, a computer can be receiving a web request, printing a document, and managing data files so quickly that it is essentially performing each of the tasks simultaneously, at least from the perspective of a human observer.

A programming construct that facilitates multitasking is the thread. A thread may be considered a placeholder for information that is being handled by a computer program, including an operating system. Each thread is usually associated with a single incarnation of a program that is servicing a single entity. In such cases, the thread is created and maintained for that single entity.

During multitasking processing, a particular thread on a processor may be idled while another thread is then executed by the processor. In this sense, a thread may also or alternatively be considered code that is executable on the processor as part of a computer program. As time permits and/or events demand, the particular thread may subsequently be re-initiated by the processor for execution.

During execution of a thread, the thread can request memory resources for storing information that is for or otherwise used by the thread. Such information may include data, objects, code, and so forth. Such memory resources may be allocated in different manners as requested.

Unfortunately, the performance of a given computing system can be adversely affected by the manner in which the memory resources thereof are allocated to multiple threads. Accordingly, there is a need for memory allocation schemes and techniques that enable, or at least improve, the efficient operation of a computing system.

SUMMARY

In an exemplary media implementation, one or more electronically-accessible media include electronically-executable instructions that, when executed, direct an electronic apparatus to perform actions including: ascertaining, from multiple processors, a processor on which a requesting thread is executing; each processor of the multiple processors associated with each respective heap of multiple respective heaps; and selecting, for a memory allocation to the requesting thread, a respective heap that is associated with the processor on which the requesting thread is executing responsive to the action of ascertaining.

In an exemplary apparatus implementation, an apparatus includes: at least one memory having multiple memory portions; multiple processors coupled to the at least one memory, each respective processor of the multiple processors executing a respective thread of multiple threads; and a memory allocator adapted to allocate memory resources from a memory portion of the multiple memory portions to each respective thread responsive to the respective processor on which each respective thread is executing.

In another exemplary media implementation, one or more electronically-accessible media include electronically-executable instructions that, when executed, direct an electronic apparatus to perform actions including: writing test data into each cache of multiple caches with reference to at least one different memory address for each cache, each respective cache corresponding to a respective processor of multiple processors; reading the test data with reference to the at least one different memory address using a thread that is executing on a particular processor of the multiple processors to acquire multiple read access timings; and ascertaining which processor of the multiple processors is the particular processor based on the reading.

Other method, system, approach, apparatus, technique, device, media, process, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Figure 1:
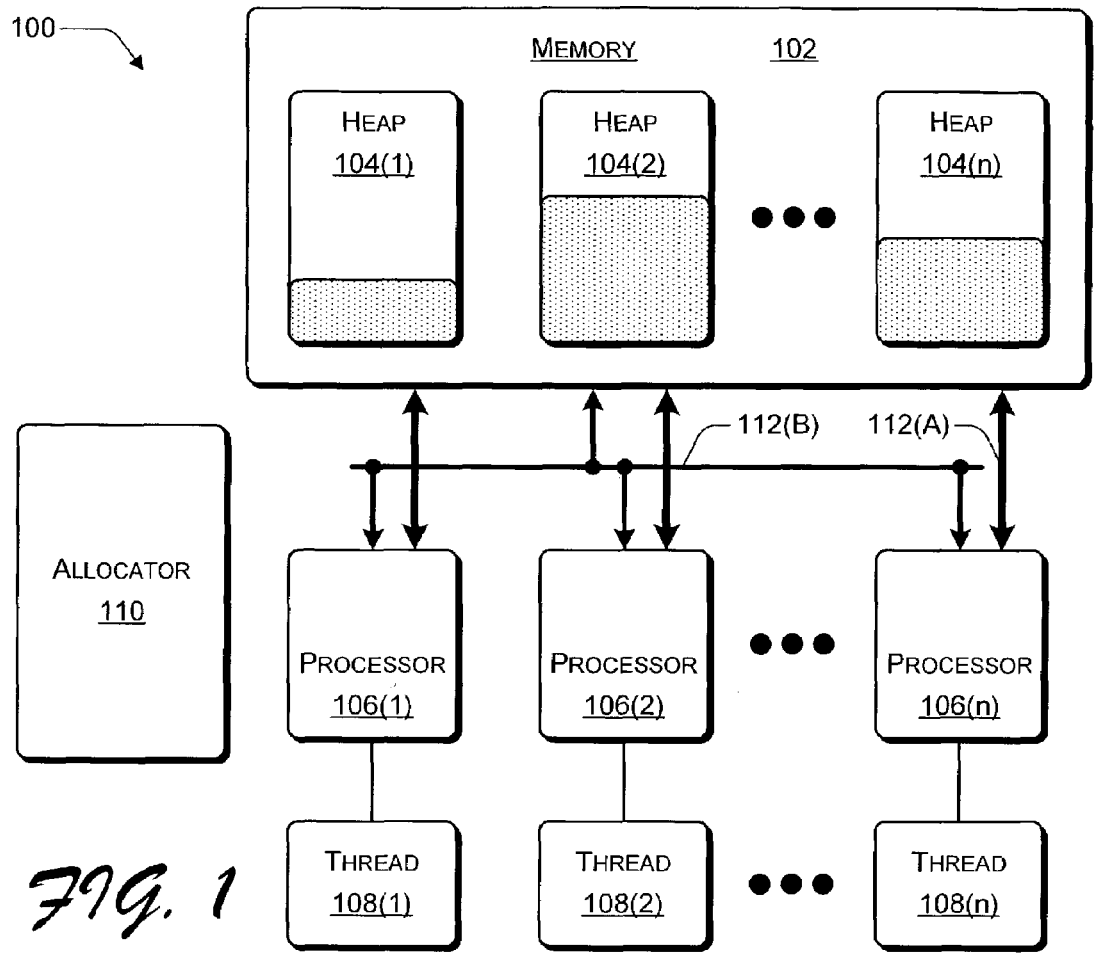
FIG. 1 illustrates a first exemplary environment in which heap allocation may be implemented.

FIG. 1 illustrates a first exemplary environment 100 in which heap allocation may be implemented. First exemplary environment 100 may be a computer, a system, another electronic device, a portion thereof, and so forth. Additional examples are provided below with reference to an exemplary operating environment 800 (of FIG. 8). As illustrated, environment 100 includes a memory 102, an allocator 110, and one or more processors 106(1), 106(2) . . . 106(n).

Processors 106 are coupled to memory 102 via a bus 112 or other mechanism. Although typically only one bus type is used in any given environment 100, processors 106 are illustrated as being coupled to memory 102 with two different bus types. Specifically, bus type 112(A) entails a direct, individual connection between each processor 106 and memory 102. Bus type 112(B), on the other hand, entails a more-indirect, shared connection between processors 106 and memory 102.

Memory 102 may be any type of storage media as described further below in the context of exemplary operating environment 800 (of FIG. 8). Memory 102 may be physically and/or logically one memory or multiple memories. Memory 102 includes one or more memory portions or heaps 104(1), 104(2) . . . 104(n). Each heap 104 is shown with an exemplary fraction or percentage thereof that is full/already allocated as indicated by the dotted shading.

Each of processors 106 may be a central processing unit (CPU) or any general processing unit. Typically, processors 106 comprise at least two processors such that environment 100 comprises a multiprocessing environment such as a symmetric multiprocessing (SMP) environment. Each processor 106(1), 106(2) . . . 106(n) usually has one thread 108(1), 108(2) . . . 108(n), respectively, that is actively executing thereon at any given moment. However, it should be noted that the total number of threads 108 is typically much greater than the number of processors 106.

In a described implementation, each processor 106 is associated with a heap 104 (or more generally a memory portion of memory 102). Specifically, each respective processor 106(1), 106(2) . . . 106(n) is associated with a respective heap 104(1), 104(2) . . . 104(n). Each heap 104 serves as a working memory portion (e.g., a scratchpad memory) for the respective processor 106. Although heaps 104 are illustrated as discrete and separate portions of memory 102, heaps 104 may actually be rearranged as a single contiguous physical memory block, as physically intermixed memory, some other configuration, and so forth.

In a described implementation, allocator 110 comprises executable code that allocates memory resources from each heap 104 on behalf of and for a thread 108 that is requesting a memory allocation for some purpose. This purpose may be to run additional code, to store one or more objects, some combination thereof, and so forth. Allocator 110 may function in any given environment 100, including but not limited to, a runtime environment. An example of a runtime environment is the common language runtime (CLR) environment of Microsoft® Corporation.

When a given thread 108 decides to use additional memory resources, thread 108 requests such additional memory resources from allocator 110. Allocator 110 is charged with selecting for allocation a memory block from among heaps 104 and informing thread 108 of the allocated memory block.

Allocator 110 may simply determine which heap 104 has the most remaining free space and allocate memory resources from that heap. This approach can delay garbage collection activities. However, this also creates additional memory overhead during garbage collection, especially when individual garbage collection threads are affinitized to individual processors. For example, if thread 108(2) is using a memory allocation segment from heap 104(1), the contents thereof are brought into the cache (not explicitly shown in FIG. 1) of processor 106(2). When this memory segment is subsequently reclaimed during a garbage collection process at the software level, the hardware is unaware of the newly irrelevant status of the contents. Consequently, when the memory segment is reallocated and reused, the hardware enforces coherency and consistency between the different levels of memory and the different processor caches. The resulting additional memory traffic creates a high overhead in terms of delay times and bandwidth usage of bus 112.

Instead of focusing on the heap 104 with the most remaining free space, allocator 110 can focus on the heap 104(x) that is associated with the processor 106(x) on which a thread 108(x) is executing. Thus, allocator 110 can allocate memory resources to a requesting thread 108 responsive to the corresponding processor 106 on which the requesting thread 108 is executing. For example, assuming that heap 104(1) is associated with processor 106(1) and that thread 108(1) is currently executing on processor 106(1), when thread 108(1) requests memory resources from allocator 110, allocator 110 allocates memory resources for thread 108(1) from heap 104(1). Additional exemplary criteria for allocating memory resources from heaps are described further below with reference to FIG. 3 et seq.

Figure 2:
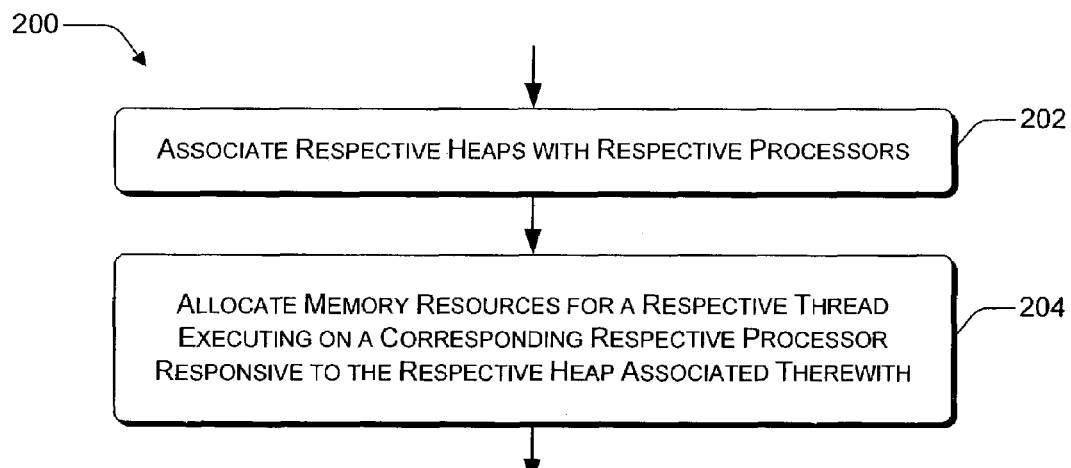
FIG. 2 is a flow diagram that illustrates a first exemplary method for heap allocation.

FIG. 2 is a flow diagram 200 that illustrates a first exemplary method for heap allocation. Flow diagram 200 includes two (2) blocks 202–204. Although the actions of flow diagram 200 may be performed in any environment, exemplary environment 100 (of FIG. 1) is used to illuminate aspects of the method.

At block 202, respective heaps are associated with respective processors. For example, each heap of heaps 104(1), 104(2) . . . 104(n) may be associated with each processor of processors 106(1), 106(2) . . . 106(n), respectively. At block 204, a memory resource is allocated for a respective thread that is executing on a corresponding respective processor responsive to the respective heap that is associated with that respective processor. For example, allocator 110 may allocate a memory resource for a thread 108(2) that is executing on a corresponding processor 106(2) from a heap 104(2) that is associated with processor 106(2) because thread 108(2) is executing on processor 106(2).

Figure 3:
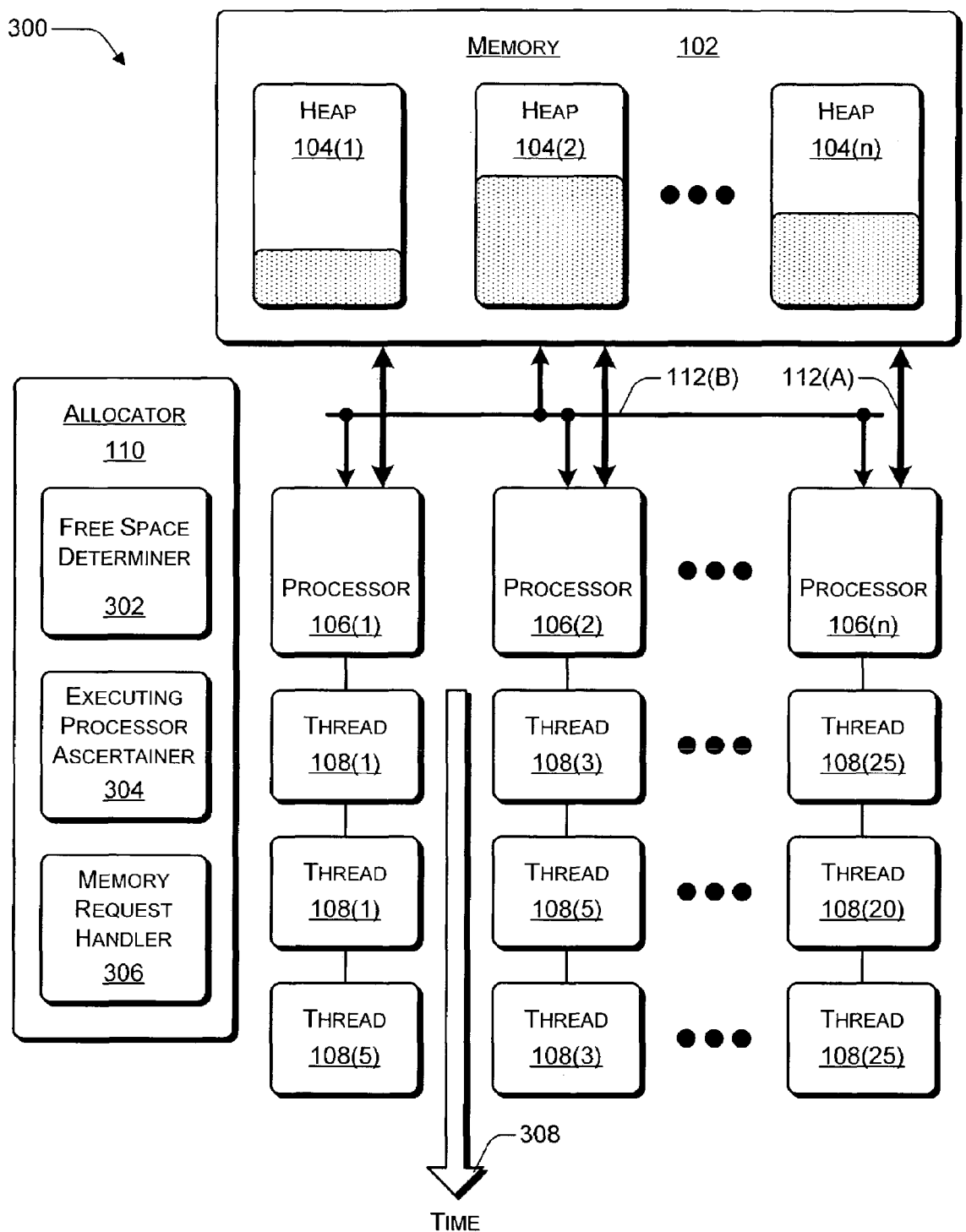
FIG. 3 illustrates a second exemplary environment in which heap allocation may be implemented.

FIG. 3 illustrates a second exemplary environment 300 in which heap allocation may be implemented. Second exemplary environment 300 includes additional components not shown in first exemplary environment 100 (of FIG. 1). For example, allocator 110 includes a free space determiner 302, an executing processor ascertainer 304, and a memory request handler 306.

Also, threads 108 that are executing on processors 106(1), 106(2) . . . 106(n) are illustrated as changing over time. As indicated by time arrow 308, respective threads 108 that are actively executing on respective processors 106 are switched over time. Specifically, at a first moment, thread 108(1) is executing on processor 106(1), thread 108(3) is executing on processor 106(2), and thread 108(25) is executing on processor 106(n). At a second moment, thread 108(1) is executing on processor 106(1), thread 108(5) is executing on processor 106(2), and thread 108(20) is executing on processor 106(n). At a third moment, thread 108(5) is executing on processor 106(1), thread 108(3) is executing on processor 106(2), and thread 108(25) is executing on processor 106(n).

Allocator 110 allocates memory from a heap 104 for a requesting thread 108 that is currently being executed by a processor 106. In a described implementation, memory request handler 306 is adapted to receive a memory allocation request, to select memory for allocation, and to provide notification of the allocated memory. To this end, memory request handler 306 uses free space determiner 302 and executing processor ascertainer 304.

Free space determiner 302 is adapted to determine a free space amount of each heap 104. This free space amount may be determined as a fraction/percentage of a given heap 104 that has not already been allocated. Optionally, free space determiner 302 may be adapted to determine a free space amount of each heap 104 per currently allocating thread 108. In other words, a total free space amount of each respective heap 104 may be divided by the total number of threads 108 that are currently allocating to the respective heap 104. Exemplary free space amount determinations are described further below with reference to FIG. 5.

Executing processor ascertainer 304 is adapted to ascertain on which processor 106 a thread 108, which is requesting a memory allocation, is currently executing. Exemplary techniques for ascertaining the executing processor of processors 106 for a given thread 108 are described further below with reference to FIGS. 5–7.

Memory request handler 306 accepts (i) the executing processor for a requesting thread 108 information from executing processor ascertainer 304 and (ii) the free space amount for each heap 104 information from free space determiner 302. The free space amount information may comprise total-free-space-amount for each heap 104 information or free-space-amount-per-allocating-thread 108 for each heap 104 information. Responsive to the executing processor information and the free space amount information, memory request handler 306 selects memory from a particular heap 104 for allocation to the requesting thread 108. This selection process and the relevant criterion (or criteria) are described further below with particular reference to FIG. 5.

After selecting memory for allocation, memory request handler 306 notifies the requesting thread 108 of the allocated memory. For example, memory request handler 306 may provide a memory address and range to the requesting thread 108.

Figure 4:
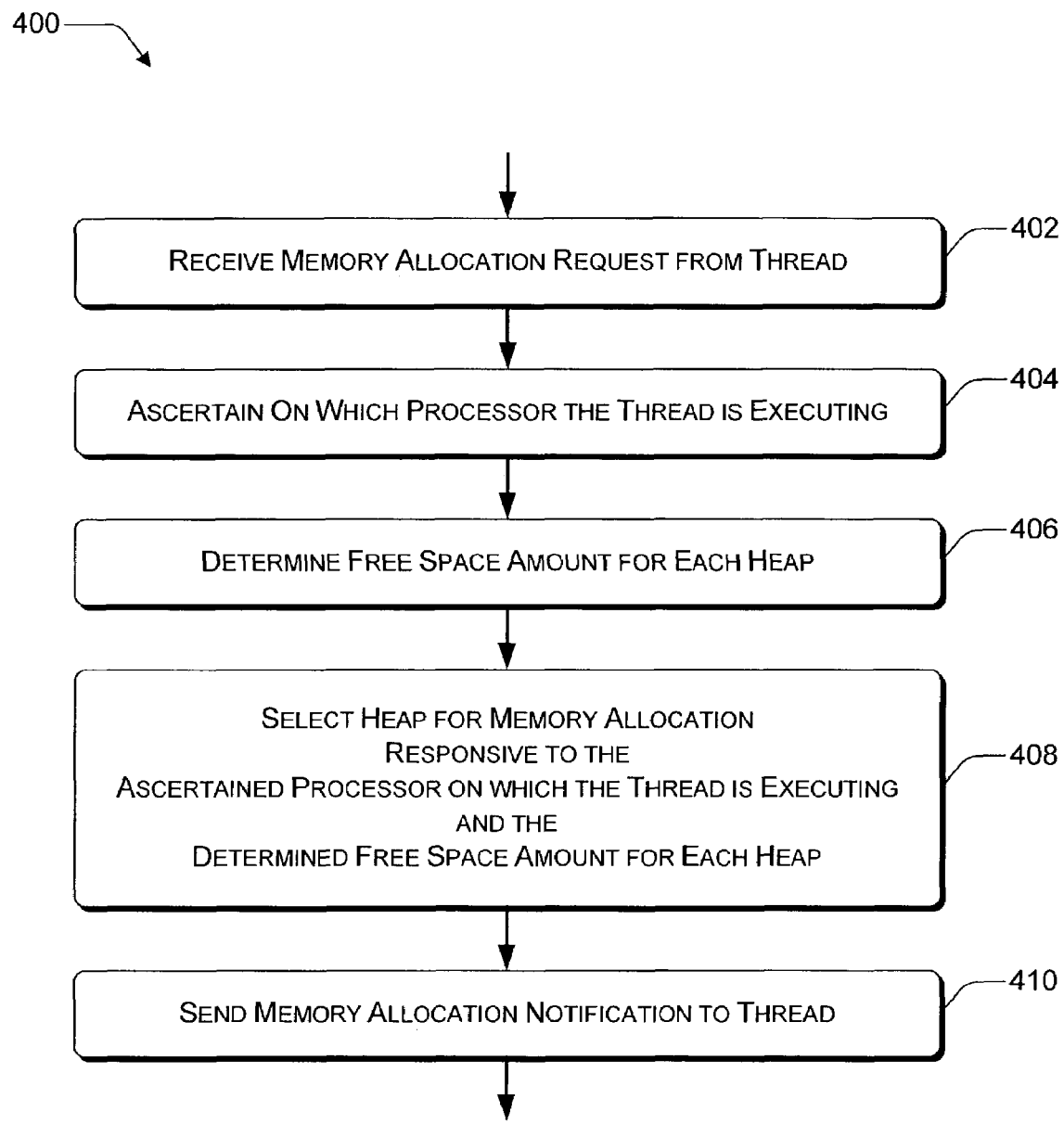
FIG. 4 is a flow diagram that illustrates a second exemplary method for heap allocation.

FIG. 4 is a flow diagram 400 that illustrates a second exemplary method for heap allocation. Flow diagram 400 includes five (5) blocks 402–410. Although the actions of flow diagram 400 may be performed in any environment, exemplary environment 300 (of FIG. 3) is used to illuminate certain aspects of the method. At block 402, a memory allocation request is received from a thread. For example, a memory request handler 306 of an allocator 110 may receive a memory allocation request from a thread 108(1) that is currently executing on processor 106(1). In operation, thread 108(1) may call code that comprises allocator 110.

At block 404, the processor on which the requesting thread is currently executing is ascertained. For example, an executing processor ascertainer 304 (possibly as orchestrated by memory request handler 306) may ascertain that thread 108(1) is currently executing on processor 106(1). Allocator 110 (e.g., memory request handler 306 or another component) is aware and has knowledge of which heap 104 is associated with which processor 106.

At block 406, a free space amount for each heap is determined. For example, a free space determiner 302 of allocator 110 may determine a free space amount for each heap 104. The free space amount may be (i) a total or absolute free space amount for each heap 104 or (ii) a free space amount per allocating thread 108 for each heap 104.

At block 408, a heap for memory allocation is selected responsive to the ascertained processor on which the requesting thread is currently executing and the determined free space amount for each heap. For example, memory request handler 306 may select a heap 104 for memory allocation based on the following two interrelated criteria. Heap 104(1), which is associated with the processor 106(1) on which the requesting thread 108(1) is currently executing, may be ordinarily selected unless another heap 104 is sufficiently empty, especially sufficiently empty relevant to heap 104(1). For instance, if the free space amount of heap 104(1) is less than the free space amount of a heap 104(y) (where heap 104(y) is the heap 104 with the greatest free space amount) and the difference between these two free space amounts is greater than a predetermined threshold, then that heap 104(y) is selected for memory allocation to thread 108(1).

At block 410, a memory allocation notification is sent to the requesting thread. For example, memory request handler 306 may notify thread 108(1) of the allocated memory from the selected heap (e.g., 104(1) or 104(y) as selected). In other words, memory request handler 306 may pass a memory address and range to thread 108(1).

Figure 5:
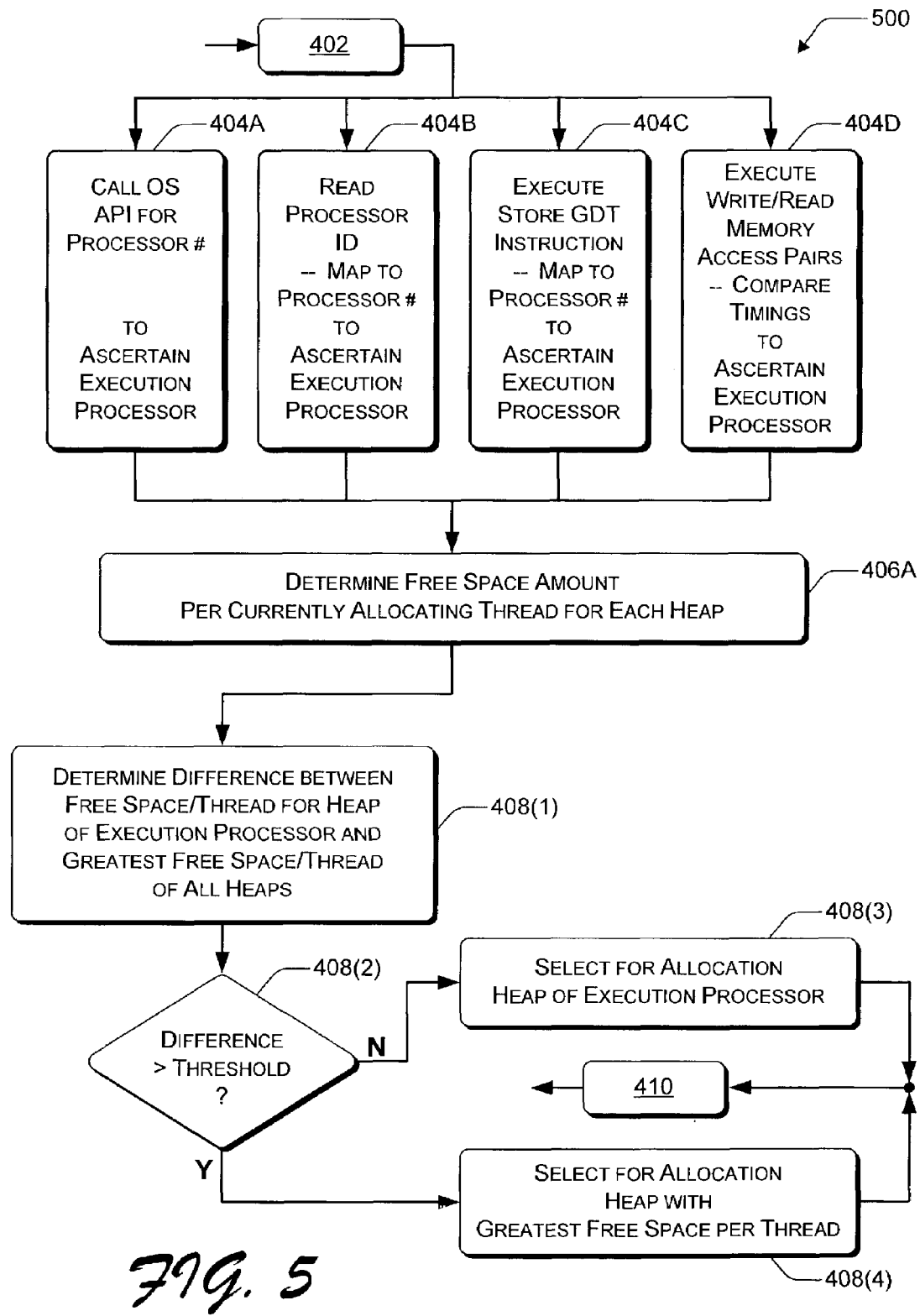
FIG. 5 is a flow diagram that illustrates additional exemplary details for the second exemplary method for heap allocation of FIG. 4.

FIG. 5 is a flow diagram 500 that illustrates additional exemplary details for the second exemplary method for heap allocation (i.e., flow diagram 400) of FIG. 4. Flow diagram 500 includes eleven (11) blocks. Although the actions of flow diagram 500 may be performed in any environment, exemplary environment 300 (of FIG. 3) is used to illuminate certain aspects of this method.

Two (2) blocks 402 and 410 do not include text, for the actions thereof may be identical to those of blocks 402 and 410 as illustrated in FIG. 4. Four (4) blocks 404A, 404B, 404C, and 404D relate to exemplary techniques for ascertaining an executing/execution processor for a given thread and correspond to block 404 of FIG. 4. One (1) block 406A relates to determining a free space amount per allocating thread for a given heap and corresponds to an exemplary implementation of block 406 of FIG. 4. Four (4) blocks 408(1), 408(2), 408(3), and 408(4) relate to selecting a heap for memory allocation to a requesting thread and correspond to an exemplary implementation of block 408 of FIG. 4.

After block 402, flow continues at one or more of blocks 404A, 404B, 404C, and 404D. At blocks 404A, 404B, 404C, and 404D, four exemplary techniques for ascertaining an execution processor corresponding to a given thread are shown. However, as indicated by the parallel flow for blocks 404A, 404B, 404C, and 404D, only one such technique needs to be implemented to accomplish the ascertaining, but second confirmations may be employed.

At block 404A, an operating system (OS) application programming interface (API) that returns a processor number is called to ascertain the execution processor. This technique is applicable to environments in which the OS offers such an API call. For example, Windows®.NET Server and successor OSs from Microsoft® Corporation include such an API call. Generally, an OS assigns each thread to a processor and retains this thread-to-processor assignment. If an OS makes the thread-to-processor assignment available through an API, then the OS API may be called to ascertain the processor number (e.g., #1, #2 . . . #n for processors 106(1), 106(2) . . . 106(n), respectively).

At block 404B, a processor identifier (ID) is read, and this ID is mapped to a processor number to ascertain the execution processor. This technique is applicable to environments in which the processors are capable of providing a processor ID. For example, some Intel® processors, such as the Pentium® IV and successors thereof, offer an Advanced Programmable Interrupt Controller (APIC) ID for interrupt purposes. This APIC ID or another read processor ID command can be used to ascertain an execution processor number. Either an allocator or a requesting thread can read the processor ID in this manner. If applicable, a processor ID-to-processor number mapping may be employed via a mapping table. An example of employing a mapping table is described below for block 404C.

At block 404C, a store Global Descriptor Table (GDT) register instruction is executed to extract a global descriptor number that is unique to each processor, and this global descriptor number is mapped to a processor number to ascertain the execution processor. This technique is applicable to environments in which the global descriptor number is accessible. For example, the global descriptor number is stored in a register for each processor and is accessible therefrom with Intel® x86 processors.

A store GDT register instruction can be used with a mapping to ascertain the execution processor number of a requesting thread as follows: Each global descriptor number is set by the OS for each processor to be unique therefor. An allocator initially creates and populates a mapping table that maps global descriptor numbers to processor numbers. To populate the mapping table, the allocator chooses a processor and sends a mapping table thread thereto. The mapping table thread executes a store GDT register instruction to extract the global descriptor number. The mapping table thread then returns this global descriptor number to the allocator.

The allocator notes the processor to which it sent the mapping table thread. Consequently, the allocator can create a table entry that maps the processor number to the returned global descriptor number. An entry is then prepared and added to the mapping table for each processor. Subsequently, when a thread requests a memory allocation, the requesting thread executes the store GDT register instruction and extracts the global descriptor number of the processor on which it is executing. Using the mapping table, the allocator can ascertain an execution processor number for the requesting thread.

At block 404D, write/read memory access pairs are executed, and timings thereof are compared to ascertain the execution processor. This memory latency technique is independent of the OS and the processors. Generally, the write part of the access ensures that known information and particular respective memory address(es) are located in caches of each respective processor. The read part provides a timing of how long it takes to retrieve the known information from each particular respective memory address. When a requesting thread is able to retrieve known information from a particular respective memory address at a low-latency cache-access speed, it may be inferred that the requesting thread is executing on the respective processor that includes in its cache that known information at that particular respective address. Exemplary specific approaches to using write/read memory access pairs to ascertain the execution processor are described further below with reference to FIGS. 6 and 7.

At block 406A, a free space amount per currently allocating thread is determined for each heap. Although this description of block 406A is directed to per-allocating-thread implementations for free space amounts, this description is also otherwise applicable to total free space amount implementations. An allocator firstly determines (e.g., calculates, keeps track of during allocations, etc.) the total free space amount for each heap.

The allocator secondly determines the number of threads that are currently allocating new memory on a heap for each heap. The total free space amount for each respective heap is divided by the number of threads that are currently allocating memory from each respective heap. The respective quotients comprise the free space amount per currently allocating thread for each respective heap. The heap having the greatest free space amount per currently allocating thread is noted for further consideration and possible memory allocation selection. The free space amount per currently allocating thread for the heap associated with the ascertained execution processor is also noted for consideration (e.g., at block 408(1)).

With reference to environment 300 (of FIG. 3), and by way of example only, it may be determined that heap 104(1) has 80% free space, that heap 104(2) has 50% free space, and that heap 104(*n*) has 60% free space. (The dotted shaded fractions, which represent the fullness of each of heaps 104 in the drawings, do not necessarily reflect the values used in this example.) As illustrated, thread 108(5) has switched from executing on processor 106(2) at an earlier moment to executing on processor 106(1) at a third or present moment. This is relevant because a thread 108 is not counted as executing on two different processors 106 or as allocating from two different heaps 104. Consequently, two threads (i.e., 108(1) and 108(5)) are executing on processor 106(1), one thread (i.e., 108(3)) is executing on processor 106(2), and two threads (i.e., 108(25) and 108(20)) are executing on processor 106(*n*).

For the sake of clarity, it is assumed that each thread 108 is currently allocating only from the heap 104 that is associated with the processor 106 on which the thread 108 is currently executing. Hence, two threads (i.e., 108(1) and 108(5)) are allocating from heap 104(1), one thread (i.e., 108(3)) is allocating from heap 104(2), and two threads (i.e., 108(25) and 108(20)) are allocating from heap 104(*n*). In this example, the free space amount per currently allocating thread for each heap is therefore: 40% for heap 104(1), 50% for heap 104(2), and 30% for heap 104(*n*).

Thus, a first criterion is comprised of the action(s) of one or more of blocks 404A, 404B, 404C, and 404D. This first criterion selects a heap for memory allocation based on the ascertained execution processor for the requesting thread. A second criterion is comprised of the action(s) of block 406A. This second criterion selects a heap for memory allocation based on which heap has the greatest free space amount per currently allocating thread. Whether the first criterion, which also corresponds to block 408(3), or the second criterion, which also corresponds to block 408(4), is used to select the heap for memory allocation is determined primarily by the actions of blocks 408(1) and 408(2) (along with those of 408(3) or 408(4)).

At block 408(1), a difference between (i) the free space amount per allocating thread for the heap associated with the execution processor of the requesting thread and (ii) the greatest free space amount per allocating thread of all the heaps is determined. In other words, the value of (i) may be subtracted from the value of (ii). The difference is then compared to a predetermined threshold.

At block 408(2), it is determined whether the difference is greater than the predetermined threshold. This threshold may be set to any level in terms of a percentage/fraction or in terms of some other units. By way of example only, it may be set between 25% and 50%.

If the difference is greater than the predetermined threshold, then at block 408(4) the heap with the greatest free space amount per allocating thread of all the heaps is selected for memory allocation. If the difference is not greater than the predetermined threshold, then at block 408(3) the heap associated with the execution processor of the requesting thread is selected for memory allocation. After either of blocks 408(3) or 408(4), flow continues at block 410.

Continuing with the above example that references environment 300, if thread 108(20) is requesting allocation of memory from a heap 104, the following analysis occurs: The difference between 50% for heap 104(2) (i.e., the greatest free space amount per allocating thread of all the heaps) and 30% for heap 104(*n*) (i.e., the free space amount per allocating thread for the heap associated with the execution processor of the requesting thread) is 20%. If the predetermined threshold is say 30%, then the 20% difference is not greater than the 30% threshold, and heap 104(*n*) is selected for memory allocation to requesting thread 108(20). If the predetermined threshold is say 10%, then the 20% difference is greater than the 10% threshold, and heap 104(2) is selected for memory allocation to requesting thread 108(20).

Figure 6:
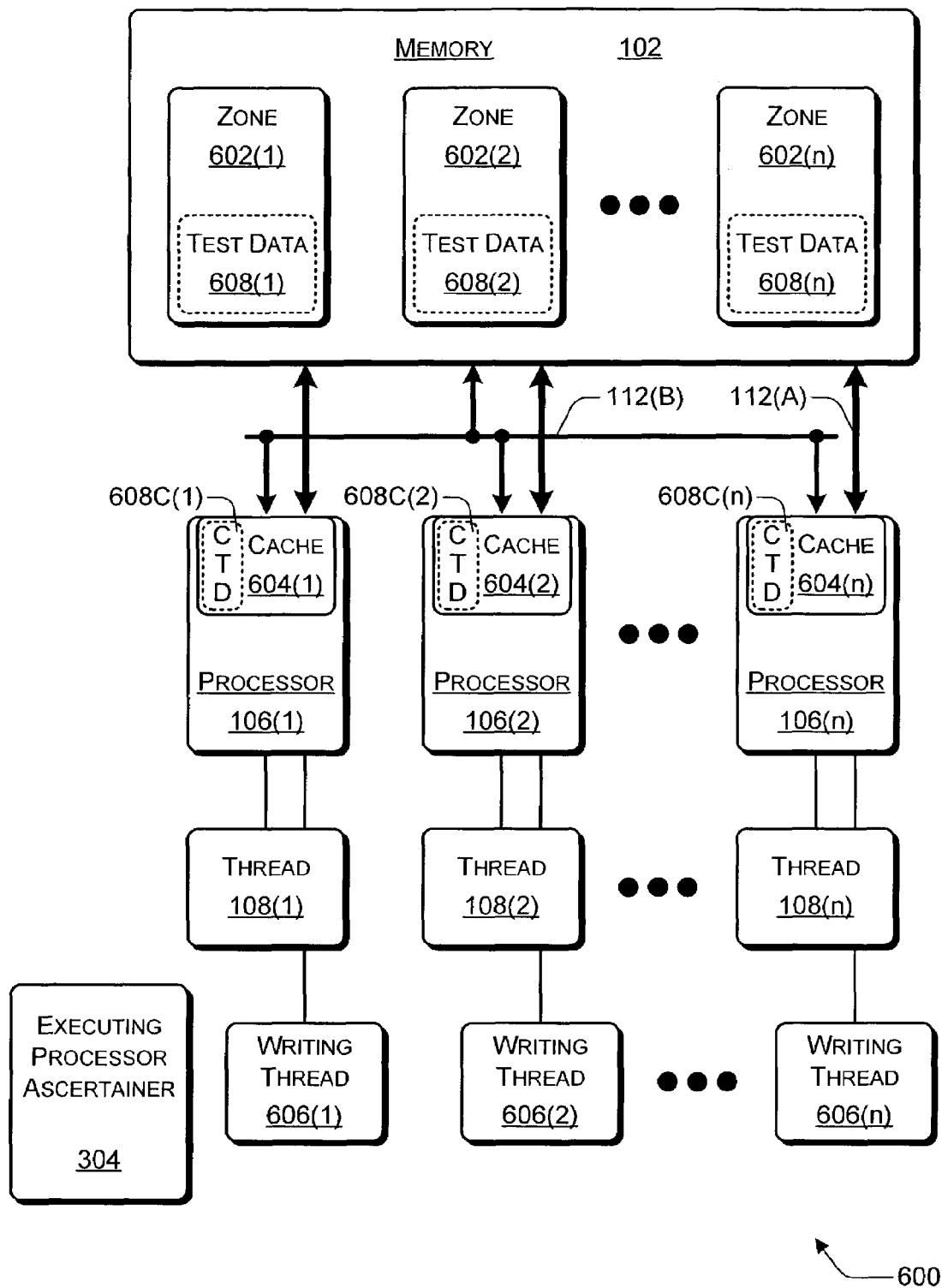
FIG. 6 illustrates an exemplary environment in which the execution processor of a thread may be ascertained.

FIG. 6 illustrates an exemplary environment 600 in which the execution processor of a thread may be ascertained. Exemplary environment 600 includes additional aspects that may be used to implement the actions of block 404D (of FIG. 5). In other words, executing processor ascertainer 304 in FIG. 6 is capable of causing the performance of write/read memory access pairs and comparisons of the timings thereof in order to ascertain the execution processor. An example of this memory latency technique is described with reference to environment 600.

Environment 600 additionally includes writing threads 606, caches 604, and memory zones 602. Specifically, memory 102 includes different memory zones 602 having different memory addresses. Each respective memory zone 602(1), 602(2) . . . 602(n) is associated with a respective processor 106(1), 106(2) . . . 106(n). For this memory latency technique, each respective processor 106 writes to its respective memory zone 602.

In addition to corresponding respective threads 108, each respective processor 106(1), 106(2) . . . 106(n) corresponds to a respective writing thread 606(1), 606(2) . . . 606(n). Each respective processor 106(1), 106(2) . . . 106(n) also includes a respective cache 604(1), 604(2) . . . 604(n). Although not so illustrated, each cache 604 may actually be comprised of multiple hierarchical caches.

In operation, executing processor ascertainer 304 establishes a writing thread 606 to be executing on each processor 106 by requesting a specific processor 106 from the OS for each writing thread 606. Each respective writing thread 606(1), 606(2) . . . 606(n) causes respective test data 608(1), 608(2) . . . 608(n) to be written into the memory addresses assigned to respective memory zones 602(1), 602(2) . . . 602(n). Although the memory addresses differ, the content of the test data may be the same across test data 608(1), 608(2) . . . 608(n).

A copy of this test data, as identified by its respective memory addresses, is cached in each respective cache 604(1), 604(2) . . . 604(n) as cached test data 608C(1), 608C(2) . . . 608C(n). Whether or not test data 608 is physically stored in memory 102 depends on the applicable cache policy. Specifically, if caches 604 are write-back caches, test data 608 is not immediately physically written to memory 102 at memory zones 602(1), 602(2) . . . 602(n) thereof. It is, however, effectively written to those memory zones 602 in terms of memory addresses. If caches 604 are write-through caches, test data 608 is relatively "immediately" written to memory 102 at the respective memory zones 602(1), 602(2) . . . 602(n).

A thread 108 that is requesting a memory allocation is ordered by executing processor ascertainer 304 to attempt to read test data 608 at the respective memory addresses associated with each respective processor 106 by virtue of respective memory zones 602. Durations for these read accesses are measured. For example, a read time stamp counter "rdtsc" instruction may be called at the beginning and the end of a read access operation, and the difference between the returned time stamp counter values may be used as the read access duration.

Usually, memory read accesses to memory addresses that are cached in a cache 604(y) corresponding to a processor 106(y) on which a thread 108(y) is currently executing are significantly faster than memory read accesses to memory addresses that are cached in caches 604(1 . . . y−1, y+1 . . . n) corresponding to other processors 106(1 . . . y−1, y+1 . . . n). Consequently, an analysis of the read access durations for reading from the memory addresses that are associated with each processor 106 can indicate an execution processor for the thread 108 performing the read access operations.

In a described implementation, such an analysis is performed by executing processor ascertainer 304. A first option is to compare the different read access durations and ascertain that the execution processor is the processor with the shortest read access duration. A second option is to compare each read access duration with a duration threshold that is longer than a typical local cache access but shorter than a typical non-local cache or system memory access. The processor 106 that corresponds to the one read access duration that is shorter than the duration threshold is ascertained as the execution processor. If more than one read access duration is shorter than the duration threshold, this technique can be repeated or another technique may be used.

A third option is to use both first and second options and to proceed with ascertaining an execution processor 106 when they both agree on the same execution processor 106 for a requesting thread 108. When using this memory latency technique, the caches 604(1), 604(2) . . . 604(n) of each of the processors 106(1), 106(2) . . . 106(n) are refreshed in between ascertainments to ensure that subsequent results are accurate. An execution processor 106 can therefore be inferentially ascertained for a requesting thread 108 by analyzing read access durations.

Figure 7:
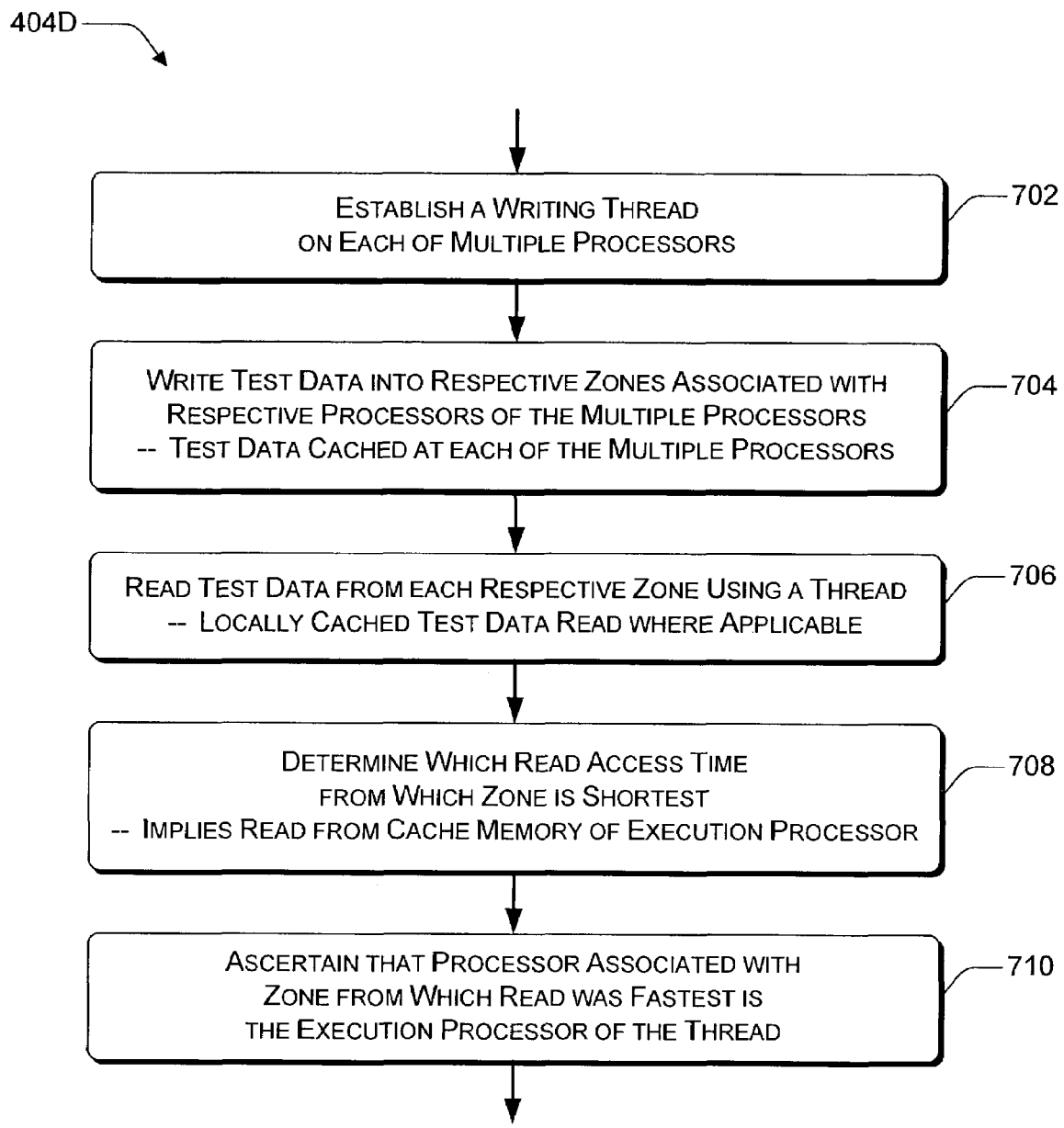
FIG. 7 is a flow diagram that illustrates an exemplary method for ascertaining the execution processor of a thread.

FIG. 7 is a flow diagram 404D that illustrates an exemplary method for ascertaining the execution processor of a thread. Flow diagram 404D includes five (5) blocks 702–710. Although the actions of flow diagram 404D may be performed in any environment, exemplary environment 600 (of FIG. 6) is used to illuminate certain aspects of the method. The method is directed to write/read memory access pairs and the analysis of the timings thereof in order to ascertain the execution processor of a given thread.

At block 702, a writing thread is established on each of multiple processors. For example, a writing thread 606 may be established by an executing processor ascertainer 304 to be executing on each processor 106 of two or more processors 106(1 . . . n).

At block 704, test data is written into respective zones that are associated with respective processors of the multiple processors. The test data is cached at each processor of the multiple processors. For example, test data 608 may be written into the memory addresses (or more generally memory address spaces) of respective memory zones 602(1), 602(2) . . . 602(n) that are associated with respective processors 106(1), 106(2) . . . 106(n) by respective writing threads 606(1), 606(2) . . . 606(n). The writing usually occurs directly into each cache 604 of each processor of respective processors 106(1), 106(2) . . . 106(n) as respective cached test data 608C(1), 608C(2) . . . 608C(n) and may physically propagate through to memory 102 without delay depending on whether the cache write policy is write-back or write-through, as described above.

At block 706, test data is read from each respective zone using a thread that is requesting a memory allocation. Cached test data that is located in a local cache is read where applicable, i.e., when it is located in the cache of the processor on which the requesting thread is executing. For example, a thread 108 such as thread 108(2) may read test data 608 from the memory addresses of memory zones 1602(1), 602(2) . . . 602(n). Test data 608(1) and 608(n) may be read from caches 604(1) and 604(n), respectively, or from memory 102 at memory zones 602(1) and 602(n), respectively, depending on the read capabilities and protocols of the overall memory system of the multiprocessing environment 600. Test data 608(2), on the other hand, may be read from local cache 604(2) as cached test data 608C(2).

At block 708, it is determined which read access time for which respective zone is the shortest. The shortest read access time implies that the test data is read from the cache memory of the processor on which the requesting thread is executing. For example, a read access duration for the reading of test data 608(2) is likely to be less than read access durations for the reading of either of test data 608(1) or 608(n) because bus 112 is utilized (along with other possible delays) when accessing non-locally-cached data. Such read access durations may also be compared to an access duration threshold. The shortest read access duration, which is for accessing test data 608(2) from the memory addresses of memory zone 602(2), implies that cached test data 608C(2) was accessed from cache 604(2) of processor 106(2) on which thread 108(2) is executing.

At block 710, it is ascertained that the processor that is associated with the zone from which the read access was fastest is the execution processor of the requesting thread. For example, it may be ascertained that processor 106(2) is currently the execution processor of thread 108(2). The heap allocation process may thereafter continue, such as by determining free space amounts of multiple heaps available for memory allocation as in blocks 406/406A (of FIG. 4/5).

Certain parts of the description herein focus on memory allocation requests. Specifically, for a given memory allocation request, an allocator selects a heap from which memory resources are allocated. However, this selection, as well as the accompanying analysis, does not necessarily need to be performed for every memory allocation request. For example, in response to an initial memory allocation request from a particular thread, the allocator may select a heap and then allocate or set aside a large memory chunk, or full allocation, that exceeds the actual memory requested by the particular thread. The allocator then actually notifies the particular thread of a smaller memory segment, or sub-allocation, from the set-aside large memory chunk.

For subsequent memory allocation requests from that particular thread, the allocator omits the heap selection analysis and allocates to the particular thread another smaller memory segment, or sub-allocation, from the already set-aside large memory chunk of the previously-selected heap. These sub-allocations continue until the large memory chunk is exhausted and the heap selection analysis is newly performed again. This full allocation/sub-allocation approach can better balance the overhead of the heap selection process against the benefits thereof. The environments of FIGS. 1, 3, and 6 and the methods of FIGS. 2, 4, 5, and 7, for example, are illustrated in diagrams that are divided into multiple blocks. However, the order and/or layout in which the environments and methods are described and/or shown is not intended to be construed as a limitation, and any number of the blocks can be combined, rearranged, augmented, omitted, etc. in any manner to implement one or more systems, methods, devices, media, apparatuses, arrangements, etc. for heap allocation. Furthermore, although the description herein includes references to specific implementations such as those of FIGS. 1, 3, and 6 (as well as the exemplary operating environment of FIG. 8), the environments and methods can be implemented in any suitable hardware, software, firmware, or combination thereof and using any suitable runtime language(s) and/or environment(s), communication mechanism(s), device architecture(s), memory system(s), and so forth.

Figure 8:
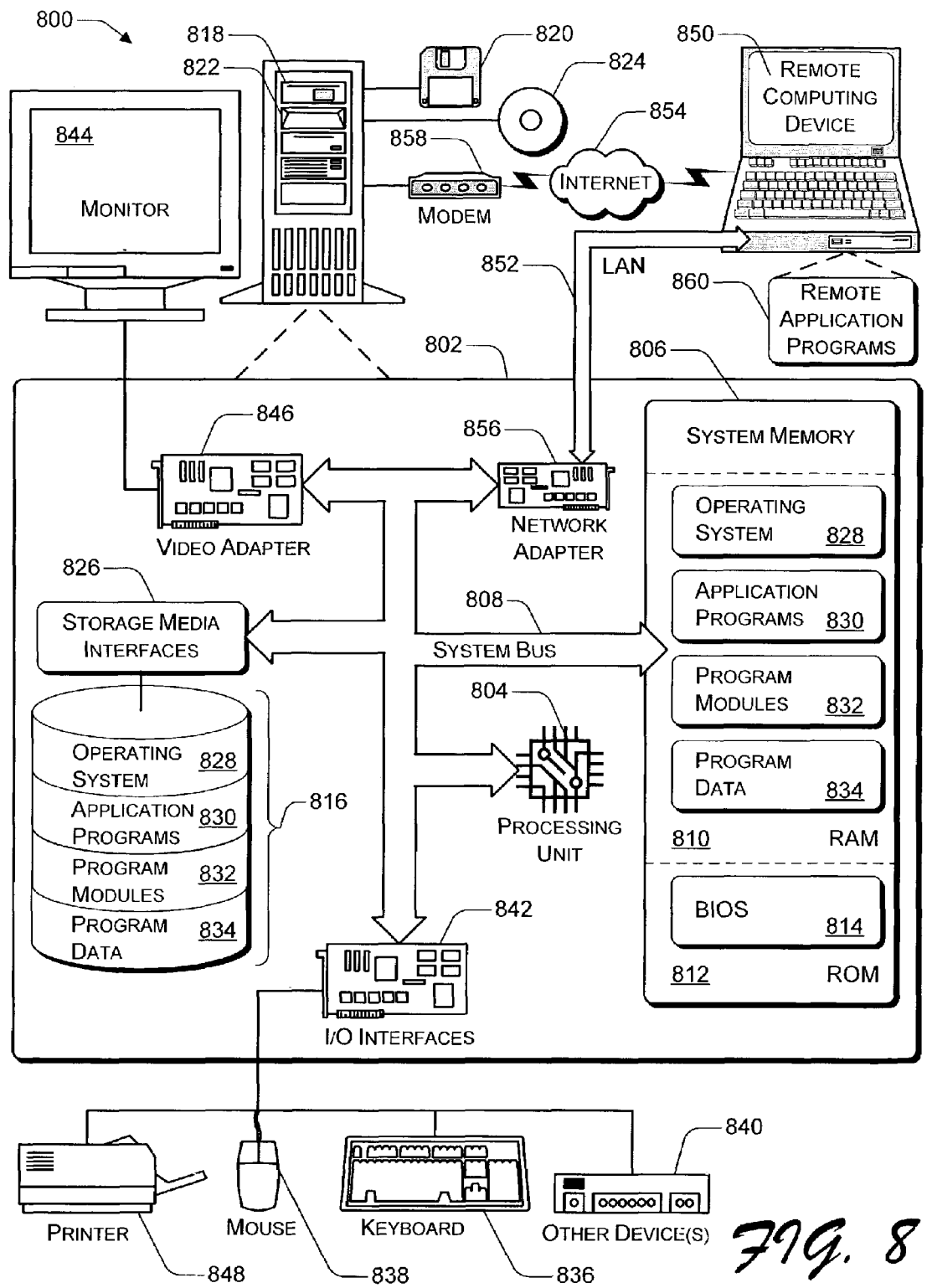
FIG. 8 illustrates an exemplary computing (or general electronic device) operating environment that is capable of (wholly or partially) implementing at least one aspect of heap allocation as described herein.

FIG. 8 illustrates an exemplary computing (or general electronic device) operating environment 800 that is capable of (fully or partially) implementing at least one system, device, apparatus, component, arrangement, protocol, approach, method, process, some combination thereof, etc. for heap allocation as described herein. Computing environment 800 may be utilized in the computer and network architectures described below or in a stand-alone situation.

Exemplary electronic device operating environment 800 is only one example of an environment and is not intended to suggest any limitation as to the scope of use or functionality of the applicable electronic (including computer, game console, television, etc.) architectures. Neither should electronic device environment 800 be interpreted as having any dependency or requirement relating to any one or to any combination of components as illustrated in FIG. 8.

Additionally, heap allocation may be implemented with numerous other general purpose or special purpose electronic device (including computing system) environments or configurations. Examples of well known electronic (device) systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, minicomputers, mainframe computers, distributed or multi-processing computing environments that include any of the above systems or devices, some combination thereof, and forth.

Implementations for heap allocation may be described in the general context of electronically-executable instructions. Generally, electronically-executable instructions include routines, programs, objects, components, data structures, etc. that perform particular tasks or implement particular abstract data types. Heap allocation, as described in certain implementations herein, may also be practiced in distributed computing environments where tasks are performed by remotely-linked processing devices that are connected through a communications link and/or network. Especially in a distributed computing environment, electronically-executable instructions may be located in separate storage media, executed by different processors, and/or propagated over transmission media.

Electronic device environment 800 includes a general-purpose computing device in the form of a computer 802, which may comprise any electronic device with computing and/or processing capabilities. The components of computer 802 may include, but are not limited to, one or more processors or processing units 804, a system memory 806, and a system bus 808 that couples various system components including processor 804 to system memory 806.

System bus 808 represents one or more of any of several types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 802 typically includes a variety of electronically-accessible media. Such media may be any available media that is accessible by computer 802 or another electronic device, and it includes both volatile and non-volatile media, removable and non-removable media, and storage and transmission media.

System memory 806 includes electronically-accessible storage media in the form of volatile memory, such as random access memory (RAM) 810, and/or non-volatile memory, such as read only memory (ROM) 812. A basic input/output system (BIOS) 814, containing the basic routines that help to transfer information between elements within computer 802, such as during start-up, is typically stored in ROM 812. RAM 810 typically contains data and/or program modules/instructions that are immediately accessible to and/or being presently operated on by processing unit 804.

Computer 802 may also include other removable/non-removable and/or volatile/non-volatile storage media. By way of example, FIG. 8 illustrates a hard disk drive or disk drive array 816 for reading from and writing to a (typically) non-removable, non-volatile magnetic media (not separately shown); a magnetic disk drive 818 for reading from and writing to a (typically) removable, non-volatile magnetic disk 820 (e.g., a "floppy disk"); and an optical disk drive 822 for reading from and/or writing to a (typically) removable, non-volatile optical disk 824 such as a CD-ROM, DVD, or other optical media. Hard disk drive 816, magnetic disk drive 818, and optical disk drive 822 are each connected to system bus 808 by one or more storage media interfaces 826. Alternatively, hard disk drive 816, magnetic disk drive 818, and optical disk drive 822 may be connected to system bus 808 by one or more other separate or combined interfaces (not shown).

The disk drives and their associated electronically-accessible media provide non-volatile storage of electronically-executable instructions, such as data structures, program modules, and other data for computer 802. Although exemplary computer 802 illustrates a hard disk 816, a removable magnetic disk 820, and a removable optical disk 824, it is to be appreciated that other types of electronically-accessible media may store instructions that are accessible by an electronic device, such as magnetic cassettes or other magnetic storage devices, flash memory, CD-ROM, digital versatile disks (DVD) or other optical storage, RAM, ROM, electrically-erasable programmable read-only memories (EEPROM), and so forth. Such media may also include so-called special purpose or hard-wired integrated circuit (IC) chips. In other words, any electronically-accessible media may be utilized to realize the storage media of the exemplary electronic system and environment 800.

Any number of program modules (or other units or sets of instructions/code) may be stored on hard disk 816, magnetic disk 820, optical disk 824, ROM 812, and/or RAM 810, including by way of general example, an operating system 828, one or more application programs 830, other program modules 832, and program data 834.

A user may enter commands and/or information into computer 802 via input devices such as a keyboard 836 and a pointing device 838 (e.g., a "mouse"). Other input devices 840 (not shown specifically) may include a microphone, joystick, game pad, satellite dish, serial port, scanner, and/or the like. These and other input devices are connected to processing unit 804 via input/output interfaces 842 that are coupled to system bus 808. However, input devices and/or output devices may instead be connected by other interface and bus structures, such as a parallel port, a game port, a universal serial bus (USB) port, an infrared port, an IEEE 1394 ("Firewire") interface, an IEEE 802.11 wireless interface, a Bluetooth® wireless interface, and so forth.

A monitor/view screen 844 or other type of display device may also be connected to system bus 808 via an interface, such as a video adapter 846. Video adapter 846 (or another component) may be or may include a graphics card for processing graphics-intensive calculations and for handling demanding display requirements. Typically, a graphics card includes a graphics processing unit (GPU), video RAM (VRAM), etc. to facilitate the expeditious performance of graphics operations. In addition to monitor 844, other output peripheral devices may include components such as speakers (not shown) and a printer 848, which may be connected to computer 802 via input/output interfaces 842.

Computer 802 may operate in a networked environment using logical connections to one or more remote computers, such as a remote computing device 850. By way of example, remote computing device 850 may be a personal computer, a portable computer (e.g., laptop computer, tablet computer, PDA, mobile station, etc.), a palm or pocket-sized computer, a watch, a gaming device, a server, a router, a network computer, a peer device, other common network node, or another computer type as listed above, and so forth. However, remote computing device 850 is illustrated as a portable computer that may include many or all of the elements and features described herein with respect to computer 802.

Logical connections between computer 802 and remote computer 850 are depicted as a local area network (LAN) 852 and a general wide area network (WAN) 854. Such networking environments are commonplace in offices, enterprise-wide computer networks, intranets, the Internet, fixed and mobile telephone networks, ad-hoc and infrastructure wireless networks, other wireless networks, gaming networks, some combination thereof, and so forth.

When implemented in a LAN networking environment, computer 802 is usually connected to LAN 852 via a network interface or adapter 856. When implemented in a WAN networking environment, computer 802 typically includes a modem 858 or other means for establishing communications over WAN 854. Modem 858, which may be internal or external to computer 802, may be connected to system bus 808 via input/output interfaces 842 or any other appropriate mechanism(s). It is to be appreciated that the illustrated network connections are exemplary and that other means of establishing communication link(s) between computers 802 and 850 may be employed.

In a networked environment, such as that illustrated with electronic device environment 800, program modules or other instructions that are depicted relative to computer 802, or portions thereof, may be fully or partially stored in a remote memory storage device. By way of example, remote application programs 860 reside on a memory component of remote computer 850 but may be usable or otherwise accessible via computer 802. Also, for purposes of illustration, application programs 830 and other electronically-executable instructions such as operating system 828 are illustrated herein as discrete blocks, but it is recognized that such programs, components, and other instructions reside at various times in different storage components of computing device 802 (and/or remote computing device 850) and are executed by data processor(s) 804 of computer 802 (and/or those of remote computing device 850).

Although systems, media, devices, methods, procedures, apparatuses, techniques, approaches, processes, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

The invention claimed is:

1. One or more electronically-accessible storage media comprising electronically-executable instructions that, when executed, direct an electronic apparatus to perform actions comprising:
   ascertaining a processor of a plurality of processors on which a requesting thread is executing;
   determining a free space amount of each heap of a plurality of heaps, each respective heap of the plurality of heaps associated with a respective processor of the plurality of processors;
   selecting a heap from the plurality of heaps for memory allocation to the requesting thread responsive to the ascertained processor on which the requesting thread is executing and to the determined free space amount of each heap of the plurality of heaps;
   receiving a memory allocation request from the requesting thread; and
   sending a memory allocation notification to the requesting thread.

2. The one or more electronically-accessible storage media comprising the electronically-executable instructions that, when executed, direct an electronic apparatus to perform the actions as recited in claim 1, wherein the action of receiving comprises the action of:
   being invoked by the requesting thread.

3. The one or more electronically-accessible storage media comprising the electronically-executable instructions that, when executed, direct an electronic apparatus to perform the actions as recited in claim 1, wherein the action of determining comprises the action of:
   determining a total free space amount for each heap of the plurality of heaps.

4. The one or more electronically-accessible storage media comprising the electronically-executable instructions that, when executed, direct an electronic apparatus to perform the actions as recited in claim 1, wherein the action of determining comprises the action of:
   determining a free space amount per tread allocating to each heap for each heap of the plurality of heaps.

5. One or more electronically-accessible storage media comprising electronically-executable instructions that, when executed, direct an electronic apparatus to perform actions comprising:
   ascertaining a processor of a plurality of processors on which a requesting thread is executing;
   determining a free space amount of each heap of a plurality of heaps, each respective heap of the plurality of heaps associated with a respective processor of the plurality of processors; and
   selecting a heap from the plurality of heaps for memory allocation to the requesting thread responsive to the ascertained processor on which the requesting thread is executing and to the determined free space amount of each heap of the plurality of heaps;
   wherein the action of ascertaining comprises the action of:
      calling an operating system (OS) application programming interface (API) that returns a processor number.

6. One or more electronically-accessible storage media comprising electronically-executable instructions that, when executed, direct an electronic apparatus to perform actions comprising:
   ascertaining a processor of a plurality of processors on which a requesting thread is executing;
   determining a free space amount of each heap of a plurality of heaps, each respective heap of the plurality of heaps associated with a respective processor of the plurality of processors; and
   selecting a heap from the plurality of heaps for memory allocation to the requesting thread responsive to the ascertained processor on which the requesting thread is executing and to the determined free space amount of each heap of the plurality of heaps;
   wherein the action of ascertaining comprises the actions of:
      reading a processor identifier (ID); and
      mapping the processor ID to a processor number.

7. One or more electronically-accessible storage media comprising electronically-executable instructions that, when executed, direct an electronic apparatus to perform actions comprising:
   ascertaining a processor of a plurality of processors on which a requesting thread is executing;
   determining a free space amount of each heap of a plurality of heaps, each respective heap of the plurality of heaps associated with a respective processor of the plurality of processors; and
   selecting a heap from the plurality of heaps for memory allocation to the requesting thread responsive to the ascertained processor on which the requesting thread is executing and to the determined free space amount of each heap of the plurality of heaps;
   wherein the action of ascertaining comprises the actions of:
      executing a store global descriptor table (GDT) register instruction to extract a global descriptor number; and
      mapping the global descriptor number to a processor number.

8. One or more electronically-accessible storage media comprising electronically-executable instructions that, when executed, direct an electronic apparatus to perform actions comprising:
   ascertaining a processor of a plurality of processors on which a requesting thread is executing;
   determining a free space amount of each heap of a plurality of heaps, each respective heap of the plurality of heaps associated with a respective processor of the plurality of processors; and
   selecting a heap from the plurality of heaps for memory allocation to the requesting thread responsive to the ascertained processor on which the requesting thread is executing and to the determined free space amount of each heap of the plurality of heaps;
   wherein the action of selecting comprises the actions of:
      determining a difference between (i) a free space amount per allocating thread of a heap of the plurality of heaps that is associated with the ascertained processor on which the requesting thread is executing and (ii) a free space amount per allocating thread of a heap of the plurality of heaps that has a greatest free space amount per allocating thread; and
      determining whether the difference is greater than a predetermined threshold;
         if so, selecting for memory allocation the heap of the plurality of heaps that has the greatest free space amount per allocating thread; and if not, selecting for memory allocation the heap of the plurality of heaps that is associated with the ascertained processor on which the requesting thread is executing.

9. An apparatus comprising:
at least one memory having a plurality of memory portions;
a plurality of processors coupled to the at least one memory, each respective processor of the plurality of processors executing a respective thread of a plurality of threads; and
a memory allocator adapted to allocate memory resources from a memory portion of the plurality of memory portions to each respective thread responsive to the respective processor on which each respective thread is executing;
wherein the memory allocator is further adapted to allocate memory resources from a memory portion of the plurality of memory portions to each respective thread responsive to a free space amount of each memory portion of the plurality of memory portions; and
wherein the free space amount comprises a free space amount per allocating thread for each respective memory portion of the plurality of memory portions; each number of allocating threads comprising a subset of a plurality of subsets of the plurality of threads, wherein each respective subset of the plurality of subsets is allocating memory resources from each respective memory portion of the plurality of memory portions.

10. The apparatus as recited in claim 9, wherein each memory portion of the plurality of memory portions comprises a heap of a plurality of heaps.

11. The apparatus as recited in claim 9, wherein each respective processor of the plurality of processors is associated with a respective memory portion of the plurality of memory portions.

12. The apparatus as recited in claim 11, wherein the memory allocator is further adapted to allocate memory resources from respective memory portions of the plurality of memory portions to respective threads of the plurality of threads as a consequence of each respective thread of the plurality of threads executing on each corresponding respective processor of the plurality of processors.

13. An apparatus comprising:
at least one memory having a plurality of heaps;
a plurality of processors coupled to the at least one memory, each processor of the plurality of processors associated with a heap of the plurality of heaps;
one or more threads that are executing on the plurality of processors; and
an allocator that is capable of handling memory allocation requests from the one or more threads, the allocator including:
an executing processor ascertainer that is adapted to ascertain on which particular processor of the plurality of processors a particular thread of the one or more threads is executing;
a free space determiner that is adapted to determine a free space amount of each heap of the plurality of heaps; and
a memory request handler that is adapted to allocate a memory block to the particular thread from a heap of the plurality of heaps responsive to (i) the particular processor on which the particular thread is executing and (ii) the free space amount of each heap of the plurality of heaps;

wherein the memory request handler is further adapted to select a particular heap of the plurality of heaps that is associated with the particular processor on which the particular thread is executing for allocation of the memory block unless a free space amount of another heap of the plurality of heaps is greater than a particular free space amount of the particular heap by more than a predetermined threshold.

14. The apparatus as recited in claim 13, wherein the free space amount of each heap of the plurality of heaps that is determined by the free space determiner comprises a total free space amount for each heap.

15. The apparatus as recited in claim 13, wherein the free space amount of each heap of the plurality of heaps that is determined by the free space determiner comprises a free space amount per thread that is allocating to each heap for each heap.

16. An apparatus comprising:
at least one memory having a plurality of heaps;
a plurality of processors coupled to the at least one memory, each processor of the plurality of processors associated with a heap of the plurality of heaps;
one or more threads that are executing on the plurality of processors; and
an allocator that is capable of handling memory allocation requests from the one or more threads, the allocator including:
an executing processor ascertainer that is adapted to ascertain on which particular processor of the plurality of processors a particular thread of the one or more threads is executing;
a free space determiner that is adapted to determine a free space amount of each heap of the plurality of heaps; and
a memory request handler that is adapted to allocate a memory block to the particular thread from a heap of the plurality of heaps responsive to (i) the particular processor on which the particular thread is executing and (ii) the free space amount of each heap of the plurality of heaps;
wherein the memory block comprises a full allocation; and wherein the allocator is adapted to actually provide sub-allocations from the full allocation for a current and for subsequent memory allocation requests from the particular thread.

17. The apparatus as recited in claim 16, wherein the executing processor ascertainer is further adapted to ascertain on which particular processor of the plurality of processors a particular thread of the one or more threads is executing using a technique that involves an operating system (OS) application programming interface (API) that returns a processor number.

18. The apparatus as recited in claim 16, wherein the executing processor ascertainer is further adapted to ascertain on which particular processor of the plurality of processors a particular thread of the one or more threads is executing using a technique that involves reading a processor identifier (ID).

19. An apparatus comprising:
at least one memory having a plurality of heaps;
a plurality of processors coupled to the at least one memory, each processor of the plurality of processors associated with a heap of the plurality of heaps;
one or more threads that are executing on the plurality of processors; and an allocator that is capable of handling memory allocation requests from the one or more threads, the allocator including:
an executing processor ascertainer that is adapted to ascertain on which particular processor of the plurality of processors a particular thread of the one or more threads is executing;
a free space determiner that is adapted to determine a free space amount of each heap of the plurality of heaps; and
a memory request handler that is adapted to allocate a memory block to the particular thread from a heap of the plurality of heaps responsive to (i) the particular processor on which the particular thread is executing and (ii) the free space amount of each heap of the plurality of heaps;
wherein the executing processor ascertainer is further adapted to ascertain on which particular processor of the plurality of processors a particular thread of the one or more threads is executing using a technique that involves extracting a global descriptor number that is unique to each processor.

20. An apparatus comprising:
at least one memory having a plurality of heaps;
a plurality of processors coupled to the at least one memory, each processor of the plurality of processors associated with a heap of the plurality of heaps;
one or more threads that are executing on the plurality of processors; and
an allocator that is capable of handling memory allocation requests from the one or more threads, the allocator including:
an executing processor ascertainer that is adapted to ascertain on which particular processor of the plurality of processors a particular thread of the one or more threads is executing;
a free space determiner that is adapted to determine a free space amount of each heap of the plurality of heaps; and
a memory request handler that is adapted to allocate a memory block to the particular thread from a heap of the plurality of heaps responsive to (i) the particular processor on which the particular thread is executing and (ii) the free space amount of each heap of the plurality of heaps;
wherein the executing processor ascertainer is further adapted to ascertain on which particular processor of the plurality of processors a particular thread of the one or more threads is executing using a technique that involves analyzing memory latencies.

21. A method for heap allocation, the method comprising:
ascertaining a processor of a plurality of processors on which a requesting thread is executing;
determining a free space amount of each heap of a plurality of heaps, each respective heap of the plurality of heaps associated with a respective processor of the plurality of processors; and
selecting a heap from the plurality of heaps for memory allocation to the requesting thread responsive to the ascertained processor on which the requesting thread is executing and to the determined free space amount of each heap of the plurality of heaps;
wherein the ascertaining comprises:
calling an operating system (OS) application programming interface (API) that returns a processor number.

22. A method for heap allocation, the method comprising:
ascertaining a processor of a plurality of processors on which a requesting thread is executing;
determining a free space amount of each heap of a plurality of heaps, each respective heap of the plurality of heaps associated with a respective processor of the plurality of processors; and
selecting a heap from the plurality of heaps for memory allocation to the requesting thread responsive to the ascertained processor on which the requesting thread is executing and to the determined free space amount of each heap of the plurality of heaps;
wherein the ascertaining comprises:
reading a processor identifier (ID); and
mapping the processor ID to a processor number.

23. A method for heap allocation, the method comprising:
ascertaining a processor of a plurality of processors on which a requesting thread is executing;
determining a free space amount of each heap of a plurality of heaps, each respective heap of the plurality of heaps associated with a respective processor of the plurality of processors; and
selecting a heap from the plurality of heaps for memory allocation to the requesting thread responsive to the ascertained processor on which the requesting thread is executing and to the determined free space amount of each heap of the plurality of heaps;
wherein the selecting comprises:
determining a difference between (i) a free space amount per allocating thread of a heap of the plurality of heaps that is associated with the ascertained processor on which the requesting thread is executing and (ii) a free space amount per allocating thread of a heap of the plurality of heaps that has a greatest free space amount per allocating thread; and
determining whether the difference is greater than a predetermined threshold;
if so, selecting for memory allocation the heap of the plurality of heaps that has the greatest free space amount per allocating thread; and
if not, selecting for memory allocation the heap of the plurality of heaps that is associated with the ascertained processor on which the requesting thread is executing.

24. The method as recited in claim 23, wherein the ascertaining comprises:
executing a store global descriptor table (GDT) register instruction to extract a global descriptor number; and
mapping the global descriptor number to a processor number.

25. The method as recited in claim 23, wherein the ascertaining comprises:
executing write/read memory access pair operations;
noting read access times from the executing; and
analyzing the read access times to find a read access time that is sufficiently short as compared to other read access times and/or as compared to a read access time threshold.

26. The method as recited in claim 23, wherein the determining comprises:
determining a total free space amount for each heap of the plurality of heaps.

27. The method as recited in claim 23, wherein the determining comprises:
determining a free space amount per thread allocating to each heap for each heap of the plurality of heaps.

28. One or more electronically-accessible storage media comprising electronically-executable instructions that, when executed, direct an electronic apparatus to perform actions comprising:

ascertaining a processor of a plurality of processors on which a requesting thread is executing, each respective processor of the plurality of processors associated with a respective heap of a plurality of heaps;

determining a free space amount per thread allocating to each heap for each heap of the plurality of heaps; and determining a difference between (i) a free space amount per allocating thread of a heap of the plurality of heaps that is associated with the ascertained processor on which the requesting thread is executing and (ii) a free space amount per allocating thread of a heap of the plurality of heaps that has a greatest free space amount per allocating thread; and selecting between (i) the heap of the plurality of heaps that is associated with the ascertained processor on which the requesting thread is executing and (ii) the heap of the plural of heaps that has the greatest free space amount per allocating thread responsive to the action of determining a difference;

wherein the action of selecting comprises the actions of:

determining whether the difference is greater than a predetermined threshold;

if so, selecting for memory allocation to the requesting thread the heap of the plurality of heaps that has the greatest free space amount per allocating thread; and if not, selecting for memory allocation to the requesting thread the heap of the plurality of heaps that is associated with the ascertained processor on which the requesting thread is executing.

29. The one or more electronically-accessible storage media comprising the electronically-executable instructions that, when executed, direct an electronic apparatus to perform the actions as recited in claim 28, wherein the action of ascertaining comprises the action of:

calling an operating system (OS) application programming interface (API) that returns a processor number.

30. The one or more electronically-accessible storage media comprising the electronically-executable instructions that, when executed, direct an electronic apparatus to perform the actions as recited in claim 28, wherein the action of ascertaining comprises the actions of:

reading a processor identifier (ID); and mapping the processor ID to a processor number.

31. The one or more electronically-accessible storage media comprising the electronically-executable instructions that, when executed, direct an electronic apparatus to perform the actions as recited in claim 28, wherein the action of ascertaining comprises the actions of:

executing a store global descriptor table (GDT) register instruction to extract a global descriptor number; and mapping the global descriptor number to a processor number.

32. The one or more electronically-accessible storage media comprising the electronically-executable instructions that, when executed, direct an electronic apparatus to perform the actions as recited in claim 28, wherein the action of ascertaining comprises the actions of:

executing write/read memory access pair operations;

noting read access times from the action of executing; and analyzing the read access times to find a read access time that is sufficiently short as compared to other read access times and/or as compared to a read access time threshold.

* * * * *